US012794004B2

(12) United States Patent
Hong et al.

(10) Patent No.: US 12,794,004 B2
(45) Date of Patent: Nov. 10, 2026

(54) METHOD FOR MANUFACTURING SECONDARY BATTERY AND APPARATUS FOR MANUFACTURING SECONDARY BATTERY

(71) Applicant: LG Energy Solution, Ltd., Seoul (KR)

(72) Inventors: Suk Hyun Hong, Daejeon (KR); Eui Kyung Lee, Daejeon (KR); Joon Sung Bae, Daejeon (KR); Sang Jih Kim, Daejeon (KR); Beom Koon Lee, Daejeon (KR); Dong Hun Bae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 969 days.

(21) Appl. No.: 17/925,438

(22) PCT Filed: Jul. 5, 2021

(86) PCT No.: PCT/KR2021/008529
§ 371 (c)(1),
(2) Date: Nov. 15, 2022

(87) PCT Pub. No.: WO2022/010210
PCT Pub. Date: Jan. 13, 2022

(65) Prior Publication Data

US 2023/0187684 A1 Jun. 15, 2023

(30) Foreign Application Priority Data

Jul. 6, 2020 (KR) ........................ 10-2020-0083106
Jul. 2, 2021 (KR) ........................ 10-2021-0087119

(51) Int. Cl.
*H01M 10/04* (2006.01)
*H01M 4/04* (2006.01)
*H01M 50/105* (2021.01)

(52) U.S. Cl.
CPC ..... *H01M 10/0481* (2013.01); *H01M 4/0447* (2013.01); *H01M 10/049* (2013.01); *H01M 50/105* (2021.01)

(58) Field of Classification Search
CPC ............. H01M 10/04; H01M 10/0404; H01M 10/0481; H01M 10/049; H01M 10/058;
(Continued)

(56) References Cited

U.S. PATENT DOCUMENTS

2011/0135997 A1 6/2011 Watanabe et al.
2011/0250485 A1* 10/2011 Tsukuda ............ H01M 10/0481
429/153

(Continued)

FOREIGN PATENT DOCUMENTS

CN 102265445 A 11/2011
CN 109478674 A 3/2019

(Continued)

OTHER PUBLICATIONS

WO 2017052283 A1 translation (Year: 2017).*

(Continued)

*Primary Examiner* — Helen Oi K Conley
*Assistant Examiner* — Amanda Rosenbaum
(74) *Attorney, Agent, or Firm* — Lerner David LLP

(57) ABSTRACT

The present invention relates to a method for manufacturing a secondary battery and an apparatus for manufacturing a secondary battery. The method for manufacturing the secondary battery according to the present invention comprises: an accommodation process of accommodating an electrode assembly, in which electrodes and separators are alternately stacked, an electrolyte, and one side portion of electrode leads connected to the electrodes, in a pouch to form a cell; an activation process of charging the cell to activate the cell; a pressing process of sequentially pressing the cell through
(Continued)

pressing rolls after the activation process to press the cell; and a degassing process of discharging an internal gas of the cell to the outside after the pressing process.

11 Claims, 11 Drawing Sheets

(58) Field of Classification Search
CPC ........... H01M 10/0585; H01M 10/446; H01M 50/105; H01M 50/30
See application file for complete search history.

(56) References Cited

U.S. PATENT DOCUMENTS

| | | | | |
|---|---|---|---|---|
| 2014/0352138 | A1 | 12/2014 | Yasooka et al. | |
| 2014/0352140 | A1 * | 12/2014 | Tasaki | H01M 50/133 29/623.2 |
| 2015/0000116 | A1 | 1/2015 | Yasooka | |
| 2015/0013720 | A1 * | 1/2015 | Yasooka | H01M 10/0481 134/6 |
| 2017/0263970 | A1 * | 9/2017 | Ogawa | H01M 50/55 |
| 2018/0034097 | A1 * | 2/2018 | Uwai | H01M 4/136 |
| 2018/0226673 | A1 | 8/2018 | Bae et al. | |
| 2019/0207183 | A1 | 7/2019 | Park et al. | |
| 2020/0266474 | A1 | 8/2020 | Bae et al. | |

FOREIGN PATENT DOCUMENTS

| | | | | |
|---|---|---|---|---|
| JP | 3490835 | B2 | 1/2004 | |
| JP | 2010086754 | A | 4/2010 | |
| JP | 2014067682 | A | 4/2014 | |
| JP | 5855483 | B2 | 2/2016 | |
| JP | 5855484 | B2 | 2/2016 | |
| JP | 6063131 | B2 | 1/2017 | |
| JP | 2018156839 | A | 10/2018 | |
| KR | 20140015647 | A | 2/2014 | |
| KR | 20140068551 | A | 6/2014 | |
| KR | 20150043754 | A | 4/2015 | |
| KR | 20150107102 | A | 9/2015 | |
| KR | 101602466 | B1 | 3/2016 | |
| KR | 101704760 | B1 | 2/2017 | |
| KR | 20170063222 | A | 6/2017 | |
| KR | 20180025805 | A | 3/2018 | |
| KR | 20180056131 | A | 5/2018 | |
| KR | 20180082759 | A | 7/2018 | |
| KR | 20180091255 | A | 8/2018 | |
| KR | 20190109146 | A | 9/2019 | |
| KR | 20200059560 | A | 5/2020 | |
| WO | WO-2017052283 | A1 * | 3/2017 | H01M 4/04 |

OTHER PUBLICATIONS

International Search Report for Application No. PCT/KR2021/008529 mailed Oct. 20, 2021, pp. 1-3.
Search Report dated Apr. 22, 25 from the Office Action for Chinese Application No. 202180033280.4 issued Apr. 24, 2025, pp. 1-3.

* cited by examiner

METHOD FOR MANUFACTURING SECONDARY BATTERY AND APPARATUS FOR MANUFACTURING SECONDARY BATTERY

CROSS-REFERENCE TO RELATED APPLICATION

The present application is a national stage entry under 35 U.S.C. § 371 of International Application No. PCT/KR2021/008529, filed on Jul. 5, 2021, which claims priority to Korean Patent Application Nos. 10-2020-0083106, filed on Jul. 6, 2020, and 10-2021-0087119, filed on Jul. 2, 2021, the disclosures of which are hereby incorporated by reference herein in their entireties.

TECHNICAL FIELD

The present invention relates to a method for manufacturing a secondary battery and an apparatus for manufacturing a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In an activation process in the process of manufacturing the secondary battery, a solid electrolyte interface (SEI layer) is generated through an electrochemical reaction between an electrode active material and an electrolyte, and as a result, an activation gas is generated as a by-product.

The generated activation gas is removed through a degassing process, but if the gas remains in a cell due to degassing defects, a gas trap is generated. Thus, the gas trap causes a problem in which lithium precipitation occurs in a subsequent charging/discharging process.

[Prior Art Document] (Patent Document) Korean Patent Publication No. 10-2014-0015647

DISCLOSURE OF THE INVENTION

Technical Problem

One aspect of the present invention is to provide a method and apparatus for manufacturing a secondary battery, which are capable of effectively removing an internal gas.

Technical Solution

A method for manufacturing a secondary battery according to an embodiment of the present invention comprises: an accommodation process of accommodating an electrode assembly, in which electrodes and separators are alternately stacked, an electrolyte, and one side portion of electrode leads connected to the electrodes, in a pouch to form a cell; an activation process of charging the cell to activate the cell; a pressing process of sequentially pressing the cell through pressing rolls after the activation process to press the cell; and a degassing process of discharging an internal gas of the cell to the outside after the pressing process, wherein, in the pressing process, the body of the pouch, in which the electrode assembly is accommodated, is pressed so that a portion of the body except for an edge of the body is pressed.

An apparatus for manufacturing a secondary battery according to an embodiment of the present invention comprises: a pressing roll configured to sequentially roll-press a cell, in which an electrode assembly, in which electrodes and separators are alternately stacked, and an electrolyte are accommodated in a pouch before a degassing process after an activation process in a process of manufacturing the secondary battery; and a support configured to support the pressing roll, wherein the pressing roll presses a body of the pouch, in which the electrode assembly is accommodated, so that a portion except for an edge of the body is pressed.

Advantageous Effects

According to the present invention, the body of the pouch may be pressed through the pressing process. Here, the body of the pouch may be pressed through the pressing roll in the full-length direction of the cell, and thus, the internal gas of the electrode assembly accommodated in the body may be easily discharged to the outside of the electrode assembly.

In addition, when the portion except for the edge of the body is pressed through the pressing roll, the internal gas between the electrode and the separator at the central portion in the electrode assembly may be easily discharged to the outside of the electrode assembly through the edge of the electrode assembly. Therefore, the phenomenon in which the gas within the electrode assembly remains to form the gas trap may be prevented from occurring to prevent the lithium from being precipitated in the subsequent charge/discharge process. In addition, the edge of the electrode assembly, which are capable of being easily ruptured or damaged, may not be pressed to prevent the electrode assembly from being damaged due to the pressing process.

MODE FOR CARRYING OUT THE INVENTION

Figure 1:
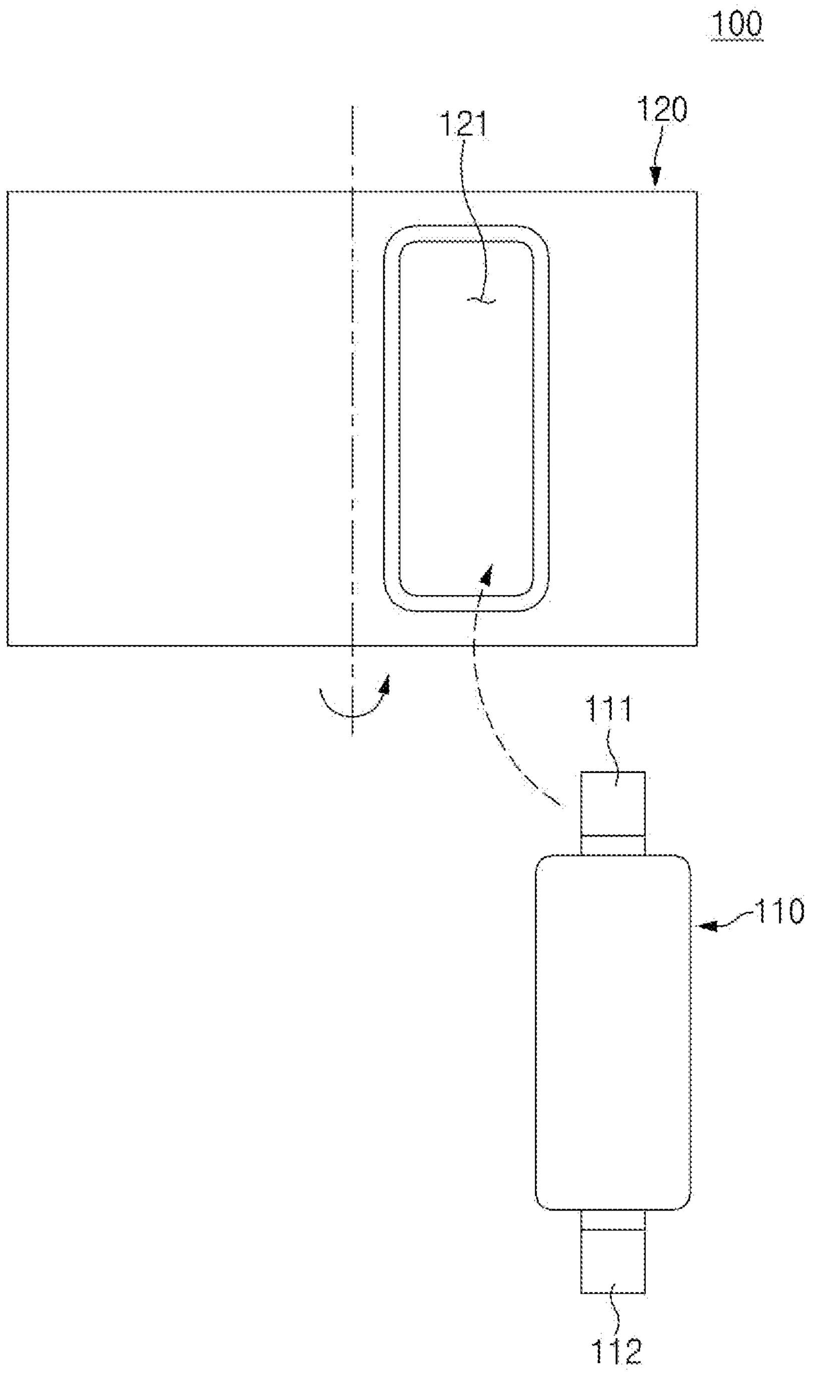
FIG. 1 is a plan view illustrating an accommodation process in a method for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Method for Manufacturing Secondary Battery According to an Embodiment

Figure 2:
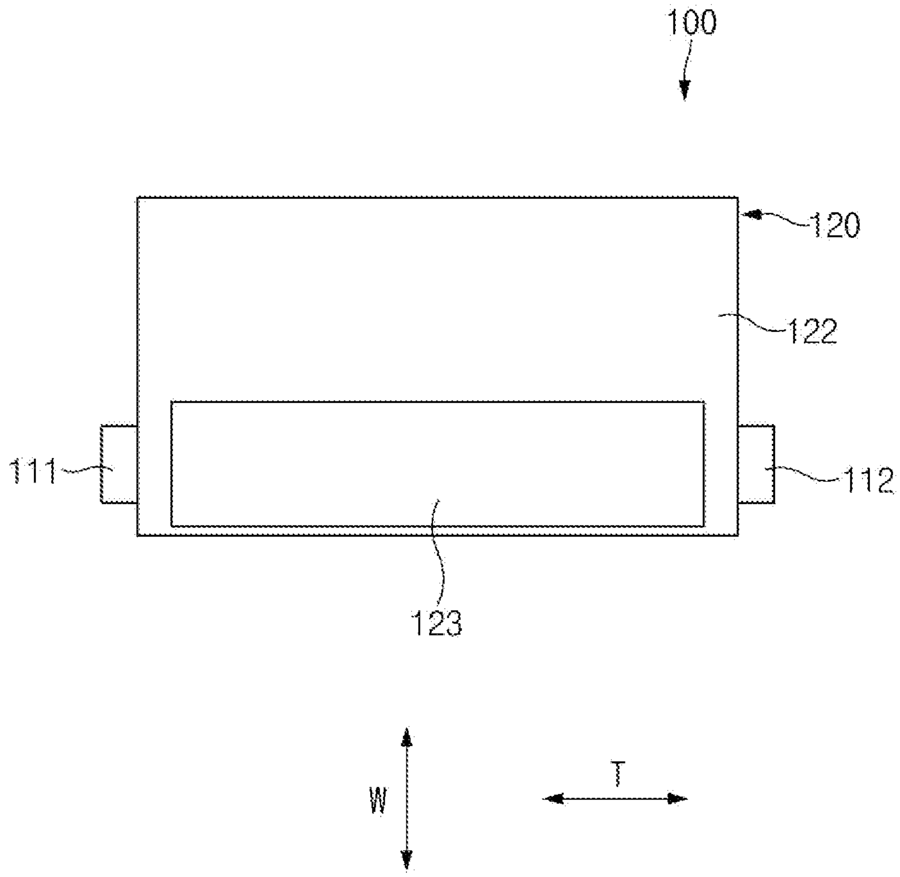
FIG. 2 is a plan view illustrating an accommodation process in the method for manufacturing the secondary battery according to an embodiment of the present invention.
Figure 3:
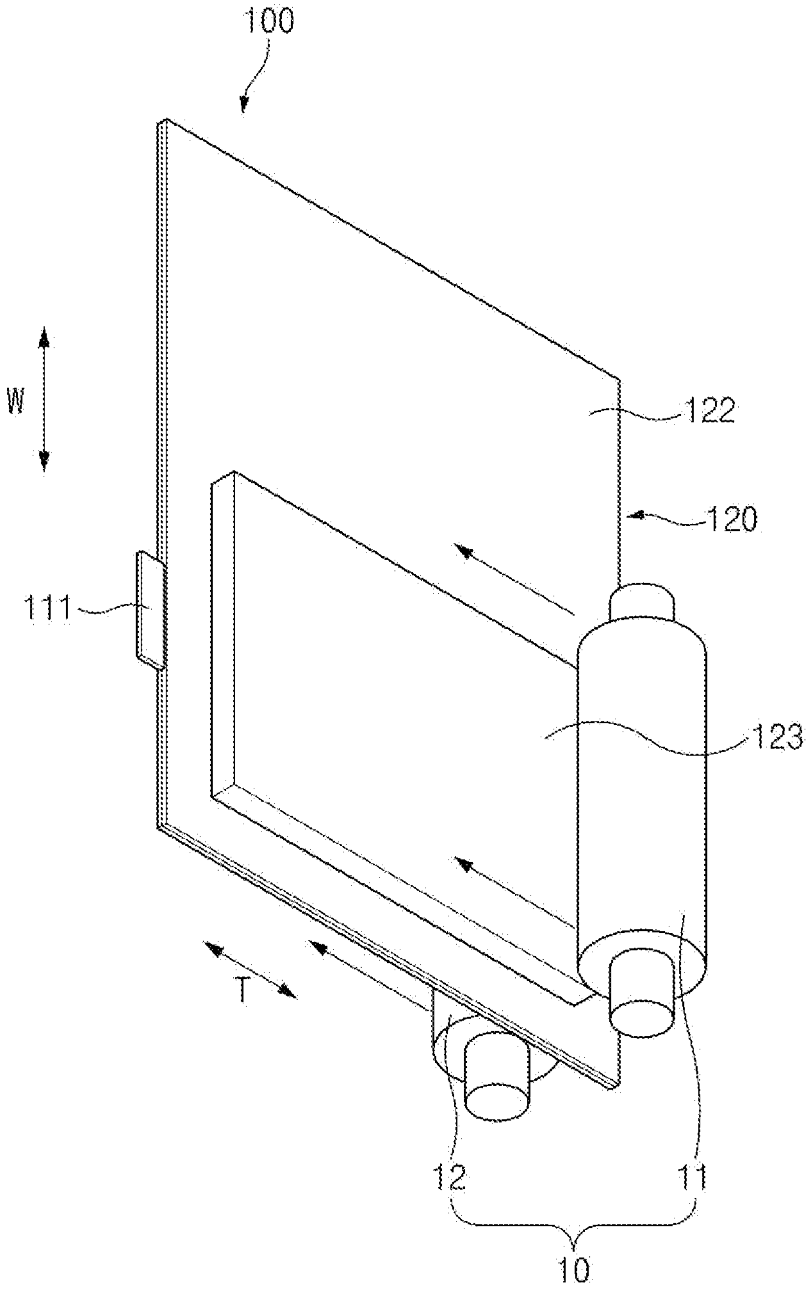
FIG. 3 is a perspective view illustrating a pressing process in the method for manufacturing the secondary battery according to an embodiment of the present invention.
Figure 4:
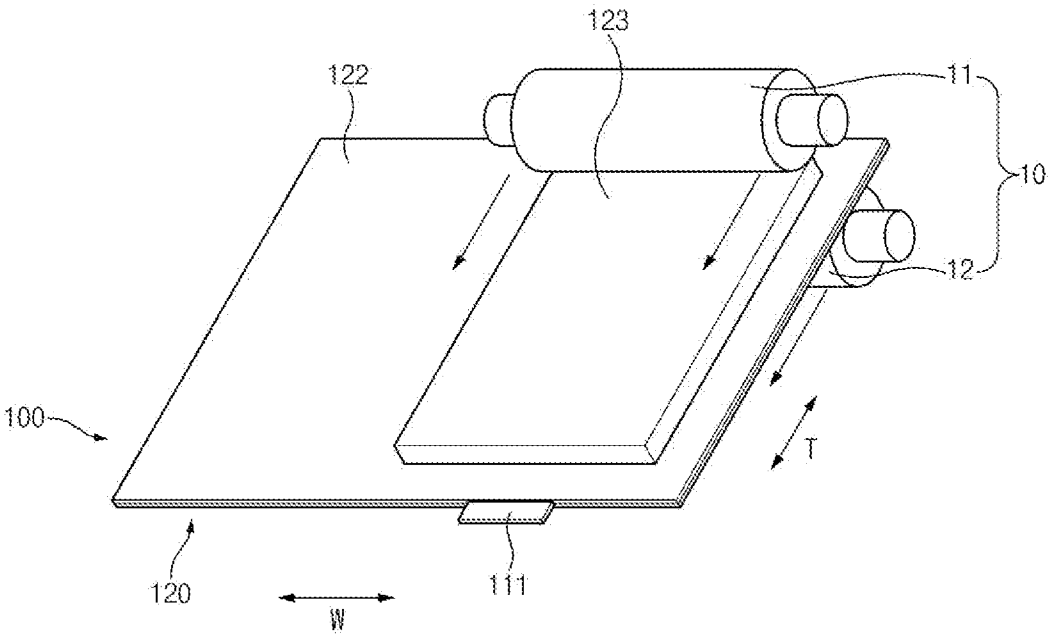
FIG. 4 is a perspective view illustrating a pressing process in the method for manufacturing the secondary battery according to an embodiment of the present invention.

FIG. 1 is a plan view illustrating an accommodation process in a method for manufacturing a secondary battery according to an embodiment of the present invention, FIG. 2 is a plan view illustrating an accommodation process in the method for manufacturing the secondary battery according to an embodiment of the present invention, FIG. 3 is a perspective view illustrating a pressing process in the method for manufacturing the secondary battery according to an embodiment of the present invention, and FIG. 4 is a perspective view illustrating a pressing process in the method for manufacturing the secondary battery according to an embodiment of the present invention. Here, FIG. 4 is a perspective view when viewed in a direction different from that in FIG. 3.

Referring to FIGS. 1 to 4, a method for manufacturing a secondary battery according to an embodiment of the present invention comprises an accommodation process of accommodating an electrode assembly 110 in a pouch 120 to form a cell 100, an activation process of activating the cell 100, a pressing process of roll-pressing the cell 100, and a degassing process of discharging an internal gas of the cell 100. In addition, the method for manufacturing the secondary battery according to an embodiment of the present invention may further comprise an aging process of allowing the cell 100 to elapse for a predetermined time and a sealing process of sealing the pouch 120.

In more detail, referring to FIG. 1, the cell 100 comprises a pouch 120 and an electrode assembly 110 accommodated in an accommodation part 121 of the pouch 120. Here, the electrode assembly 110 may comprise electrode leads 111 and 112 electrically connected to electrodes.

The electrode assembly 110 may be a chargeable and dischargeable power generation element and be formed by alternately stacking electrodes and separators.

The electrodes may be constituted by a positive electrode and a negative electrode. At this time, the electrode assembly 110 may have a structure in which the positive electrode/separator/negative electrode are alternately stacked.

For example, in the plan view, the positive electrode may be formed to be larger than the negative electrode. Here, for example, the negative electrode may be formed to have a length and width, each of which is larger by 0.5 mm to 1.5 mm than each of those of the positive electrode. Here, more specifically, for example, the negative electrode may be formed to have a length and width, each of which is larger by about 2 mm than each of those of the positive electrode. That is, when the positive electrode, the separator, and the negative electrode are stacked, an end of the negative electrode in a lateral direction may further protrude by about 1 mm than an end of the positive electrode.

Also, the electrode leads 111 and 112 may comprise a positive electrode lead 111 connected to the positive electrode and a negative electrode lead 112 connected to the negative electrode.

The positive electrode may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode may comprise a negative electrode collector and a negative active material stacked on the negative electrode collector.

The negative electrode collector may be made of, for example, a foil made of a copper (Cu) material.

The negative active material may be a compound or a mixture containing a graphite-based material.

The separator is made of an insulating material to electrically insulates the positive electrode and the negative electrode from each other. Here, the separator may be made of a polyolefin-based resin film such as polyethylene or polypropylene having microporosity.

Referring to FIGS. 1 and 2, in the accommodation process, the electrode assembly 110, the electrolyte, and one side portion of each of the electrode leads 111 and 112 connected to the electrodes may be accommodated in the accommodation part 121 formed in the pouch 120 to form the cell 100.

In addition, in the accommodation process, the other side portion of each of the electrode leads 111 and 112 may be accommodated to protrude to the outside of the pouch 120.

Here, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100. Here, the full-width direction W of the cell 100 may be perpendicular to a full-length direction T, which is a protrusion direction of the electrode leads 111 and 112 in the plan view. In this case, the electrode assembly 110 may have, for example, a length greater than a width. That is, the electrode assembly 110 may be formed so that the length of the cell 100 in the full-length direction T is greater than the width in the full-width direction W of the cell 100.

In the activation process, the cell 100 is charged to be activated. Here, in the activation process, the cell 100 may be charged by connecting electricity to the electrode leads 111 and 112 of the cell 100.

Figure 5:
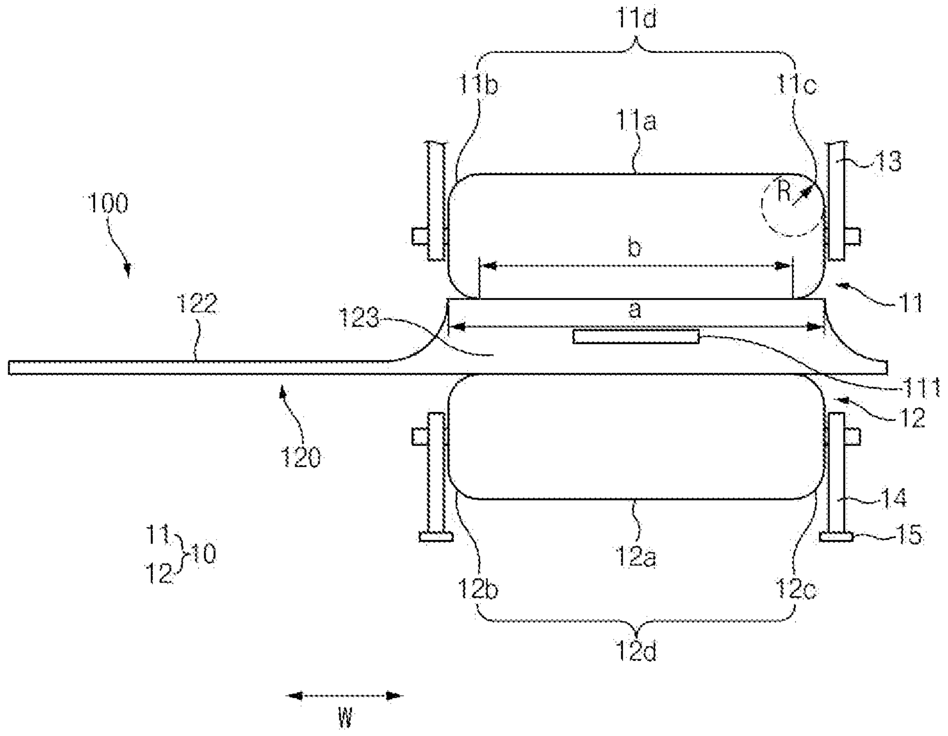
FIG. 5 is a front view illustrating a pressing process in the method for manufacturing the secondary battery according to an embodiment of the present invention.

FIG. 5 is a front view illustrating a pressing process in the method for manufacturing the secondary battery according to an embodiment of the present invention.

Referring to FIGS. 4 to 5, in the pressing process, after the activation process, the cell 100 is sequentially pressed through pressing rolls 10 to perform a roll press.

In addition, in the pressing process, the cell 100 may be roll-pressed in the full-length direction T of the cell 100, which is the protrusion direction of the electrode leads 111 and 112.

In the pressing process, the body 123 of the pouch 120 may be pressed.

In the pressing process, after disposing the cell 100 between the pair of pressing rolls 10, the pair of pressing rolls 10 may sequentially press both surfaces of the cell 100. Here, the pressing roll 10 may be in line contact with the cell 100. Thus, when the cell 100 is pressed through the pressing rolls 10 while being rolled, a linear pressure is sequentially applied to an outer surface of the cell 100. Thus, the gas disposed inside the electrode assembly 110 may be easily discharged to the outside of the electrode assembly 110.

Here, the pair of pressing rolls 10 may comprise a first roll 11 for pressing an upper portion of the cell 100 and a second roll 12 for pressing a lower portion of the cell 100. In addition, the first roll 11 and the second roll 12 may be supported by supports 13 and 14. At this time, in the pressing process, the support 13 supporting the first roll 11 may move vertically by a moving means, and thus, the upper portion of the cell 100 may be pressed through the first roll 11. Here, the moving means may be, for example, a pneumatic or hydraulic actuator.

In the pressing process, for example, a tab or the pouch 120 of the cell 100 may be held and fixed through a fixing means to press the cell 100 while the pressing roll 10 moves. In this case, the fixing means may be, for example, a fixing jig.

In addition, as another example of the pressing process, the cell 100 may be input between the pair of pressing rolls 10 so as to be pressed.

Furthermore, in the pressing process, the pair of pressing rolls 10 may be provided as one roll set, and also, one or more roll sets may be provided.

In the pressing process, the pair of pressing rolls 10 may be provided at a horizontal position.

In addition, in the pressing process, a gap between the pair of pressing rolls 10 may be adjusted. Here, in the pressing process, a distance between the pair of pressing rolls 10 may be maintained within a predetermined gap range.

Furthermore, in the pressing process, pressing force applied to the cell 100 through the pressing rolls 10 may be adjusted. Here, in the pressing process, the pressing force applied to the cell 100 may be maintained within a predetermined pressure range. At this time, the pressing process may be performed so that the pressing force of the pressing roll 10 for pressing the cell 100 ranges of 10 kgf to 150 kgf. In addition, a load pressed to the cell 100 may be detected through a load cell 15 provided on the support 14 supporting the pressing roll 10. Here, for example, the load cell 15 may be provided on the support 14 supporting the second roll 12 disposed below the cell 100.

In the pressing process, a portion except for an edge of the body 123 in the pouch 120 may be pressed in the full-width direction W of the cell 100.

In addition, in the pressing process, the pressing roll 10 may be formed to have a diameter of each of both side portions **11*d* and 12*d*, which is smaller than a diameter of each of central portions 11*a* and 12*a***.

In this case, in the pressing process, a length b of the central portion of the pressing roll 10 may be provided to be smaller than a width a of the body 123. That is, in the pressing process, the length b of the central portion of the pressing roll 10, which is parallel to the full-length direction T of the cell 100, may be provided to be smaller than the width a of the body 123 of the pouch 120, which is parallel to the full-length direction T of the cell 100 so that the portion except for the edge of the body 123 is pressed. At this time, the width a of the body 123 may be, for example, a width of a bottom surface of the accommodation part 121 in the pouch 110. Here, the width a of the body 123 in the pouch 110 may correspond to, for example, a width of the electrode assembly 110.

Here, both side portions **11*d* and 12*d* of the pressing roll 10 may comprise one side portion lib disposed at one side in the full-width direction W of the cell 100 and the other side portion 11*c*** disposed at the other side.

In addition, in the pressing process, each of both side portions **11*d* and 12*d* of the pressing roll 10** may be formed to have a diameter that is gradually smaller toward an end thereof.

Here, in the pressing process, an outer surface of each of both the side portions **11*d* and 12*d* of the pressing roll 10 may have a curvature that is rounded from each of the central portions 11*a* and 12*a* toward each of the ends. That is, in the pressing roller 10, the curvature may be formed at a corner of each of both the side portions 11*d* and 12*d* in the full-width direction W of the cell 100. Thus, in the electrode assembly 110 accommodated in the body 123, a central portion except for the edge in the full-length direction T of the cell 100 may be pressed by the central portions 11*a* and 12*a* of the pressing roll 10. Thus, the gas disposed in the central portion of the electrode assembly 110 may move to the edge of the electrode assembly 110 and then be discharged to the outside of the electrode assembly 110. Here, the gas discharged to the outside of the electrode assembly 110 may be disposed in the accommodation part 121 or the gas pocket part 122 inside the pouch 120 and then be discharged to the outside of the pouch 120** through the degassing process.

At this time, the rounded curvature formed on the outer surfaces of each of both the side portions **11*d* and 12*d* in the pressing roll 10** may be formed to have a curvature radius R of 5 mm to 50 mm.

Thus, the curvature radius R is formed to be 5 nm or more, which is a lower limit value to prevent press marks on the battery and also prevent the battery from being damaged by the edge of the pressing roll 10. In addition, since the curvature radius R is formed to be less than 50 mm or less, which is an upper limit value, and thus. the pressing effect for removing the gas at the outer shell of the battery may not be deteriorated.

In the aging process, after the activation process, the cell 100 may elapse for a predetermined time. Here, in the aging process, the cell 100 may elapse for a predetermined time at room temperature and a high temperature. In this case, the aging process may be performed before the degassing process.

The pressing process may be performed during the aging process.

Figure 6:
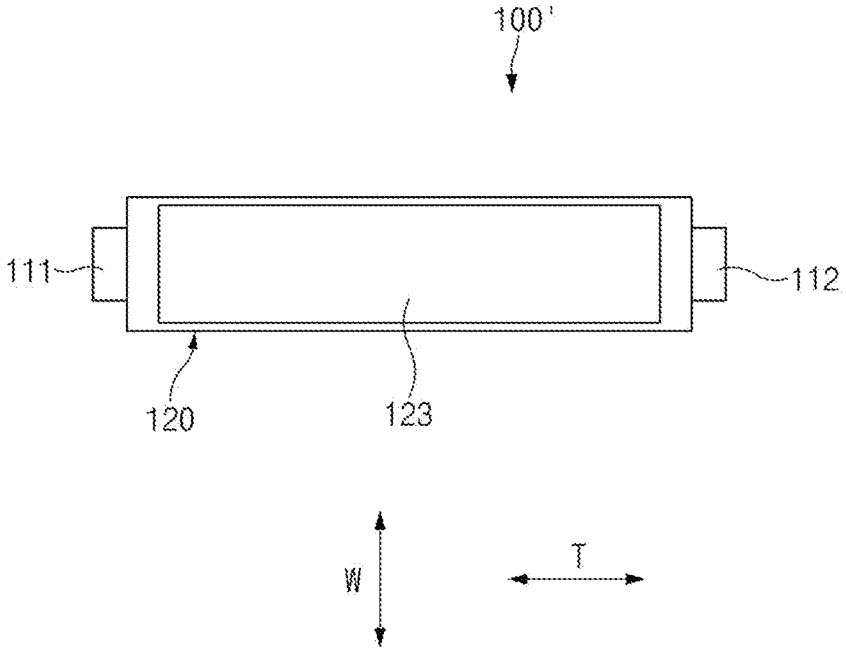
FIG. 6 is a plan view illustrating a secondary battery in the method for manufacturing the secondary battery according to an embodiment of the present invention.

FIG. 6 is a plan view illustrating a secondary battery in the method for manufacturing the secondary battery according to an embodiment of the present invention.

Referring to FIG. 6, in the sealing process, after the degassing process, an outer circumferential surface of the pouch 120 may be sealed to manufacture a secondary battery 100'.

In this case, in the sealing process, the gas pocket part 122 may be cut to be removed, and then, the removed portion may be sealed through thermal fusion to seal the pouch 120.

Referring to FIGS. 1 and 4, in the method for manufacturing the secondary battery according to an embodiment of the present invention, which is configured as described above, the body 123 of the pouch 120 may be pressed through the pressing process Here, the body 123 may be pressed through the pressing rolls 10 in the full-length direction T of the cell 100 to easily discharge the internal gas of the electrode assembly 110 accommodated in the body 123 to the outside of the electrode assembly 110.

Here, when the portion except for the edge of the body 123 is pressed through the pressing rolls 10, the central portion of the electrode assembly 110 accommodated in the body 123 may be pressed, and thus, the internal gas between the electrode and the separator at the central portion in the electrode assembly 110 may be easily discharged to the outside of the electrode assembly 110 through the edge of the electrode assembly 110. Therefore, the phenomenon in which the gas within the electrode assembly 110 remains to form the gas trap may be prevented from occurring to prevent the lithium from being precipitated in the subsequent charge/discharge process. In addition, the edge of the electrode assembly 110, which are capable of being easily ruptured or damaged, may not be pressed to prevent the electrode assembly 110 from being damaged due to the pressing process.

Method for Manufacturing Secondary Battery According to Another Embodiment

Hereinafter, a method for manufacturing a secondary battery according to another embodiment of the present invention will be described.

Figure 7:
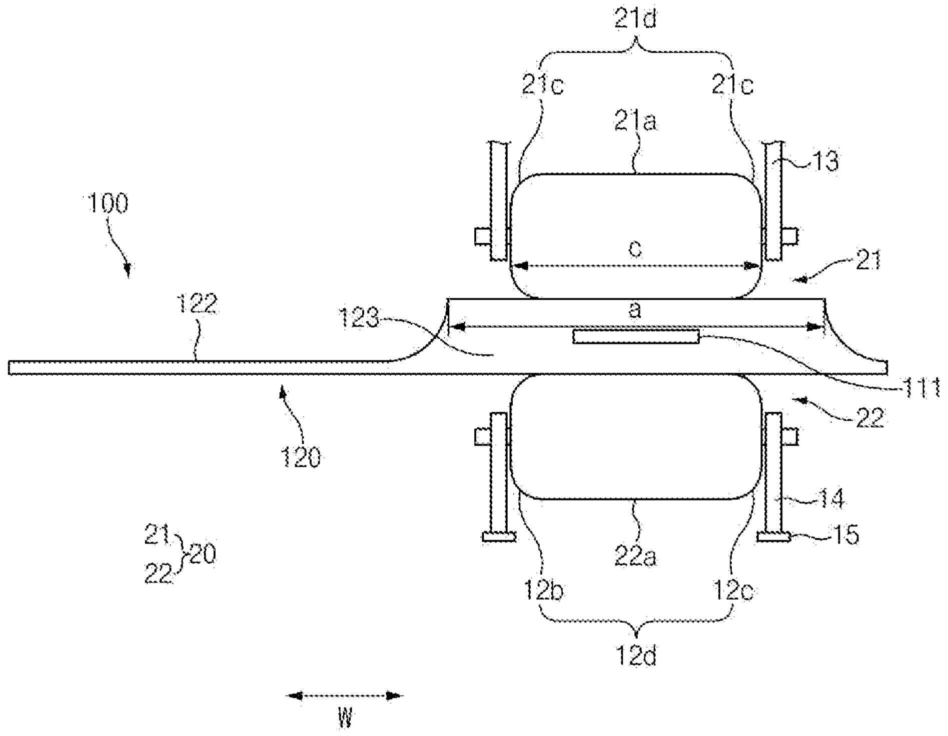
FIG. 7 is a front view illustrating a pressing process in a method for manufacturing a secondary battery according to another embodiment of the present invention.

FIG. 7 is a front view illustrating a pressing process in a method for manufacturing a secondary battery according to another embodiment of the present invention.

Referring to FIGS. 1, 2, and 7, a method for manufacturing a secondary battery according to another embodiment of the present invention comprises an accommodation process of accommodating an electrode assembly 110 in a pouch 120 to form a cell 100, an activation process of activating the cell 100, a pressing process of roll-pressing the cell 100, and a degassing process of discharging an internal gas of the cell 100.

In addition, the method for manufacturing the secondary battery according to another embodiment of the present invention may further comprise an aging process of allowing the cell 100 to elapse for a predetermined time and a sealing process of sealing the pouch 120.

The method for manufacturing the secondary battery according to another embodiment of the present invention is different from the method for manufacturing the secondary battery according to the foregoing embodiment of the present invention in embodiment of a pressing process. Thus, contents of this embodiment, which are duplicated with those according to the forgoing embodiment, will be omitted or briefly described, and also, differences therebetween will be mainly described.

In more detail, in the method for manufacturing the secondary battery according to another embodiment of the present invention, in an accommodation process, an electrode assembly 110, an electrolyte, and one side portion of each of the electrode leads 111 and 112 connected to the electrodes may be accommodated in an accommodation part 121 formed in a pouch 120 to form a cell 100.

In addition, in the accommodation process, the other side portion of each of the electrode leads 111 and 112 may be accommodated to protrude to the outside of the pouch 120.

Here, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100.

In the pressing process, after the activation process, the cell 100 is sequentially pressed through pressing rolls 20 to perform a roll press.

In addition, in the pressing process, the cell 100 may be roll-pressed in a full-length direction T of the cell 100, which is the protrusion direction of the electrode leads 111 and 112. Here, in the pressing process, the body 123 of the pouch 120 may be pressed.

Furthermore, in the pressing process, after disposing the cell 100 between the pair of pressing rolls 20, the pair of pressing rolls 20 may sequentially press both surfaces of the cell 100. Here, the pressing roll 20 may be in line contact with the cell 100. Thus, when the cell 100 is pressed through the pressing rolls 20 while being rolled, a linear pressure is sequentially applied to an outer surface of the cell 100. Thus, the gas disposed inside the electrode assembly 110 may be easily discharged to the outside of the electrode assembly 110. Here, the pair of pressing rolls 20 may comprise a first roll 21 for pressing an upper portion of the cell 100 and a second roll 22 for pressing a lower portion of the cell 100.

In the pressing process, the pair of pressing rolls 20 may be provided at a horizontal position.

Also, in the pressing process, a portion except for an edge of the body 123 in the pouch 120 may be pressed in the full-width direction W.

In addition, in the pressing process, a length c of the pressing roll 20 may be provided to be smaller than a width a of the body 123.

That is, in the pressing process, the length c of the pressing roll 20, which is parallel to the full-length direction T of the cell 100, may be provided to be smaller than the width a of the body 123 in the pouch 120, which is parallel to the full-length direction T of the cell 100 so that the portion except for the edge of the body 123 is pressed.

Thus, in the electrode assembly 110 accommodated in the body 123, a central portion except for the edge in the full-length direction T of the cell 100 may be pressed by the pressing roll 20. Thus, the gas disposed in the central portion of the electrode assembly 110 may move to the edge of the electrode assembly 110 and then be discharged to the outside of the electrode assembly 110.

The length c of the pressing roll 20 may be formed, for example, to be smaller by 2 mm to 10 mm than the width a of the body 123 in the pouch 120.

Thus, the length c of the pressing roll 20 may be formed to be smaller by 2 mm or more, which is a lower limit value, than the width a of the body 123 to prevent an outer shell of the electrode assembly 110 from being damaged. That is, when the electrode assembly 100 in which a negative electrode is formed to be larger than a positive electrode is pressed in a stacking direction, the negative electrode may be prevented from being damaged by an edge of the positive electrode. In addition, the length c of the pressing roll 20 may be formed to be smaller by 10 mm or less, which an upper limit value, than the width a of the body 123 to prevent a gas removal effect at an outer shell-side of the battery from being deteriorated.

Method for Manufacturing Secondary Battery According to Further Another Embodiment Hereinafter, a method for manufacturing a secondary battery according to further another embodiment of the present invention will be described.

Figure 8:
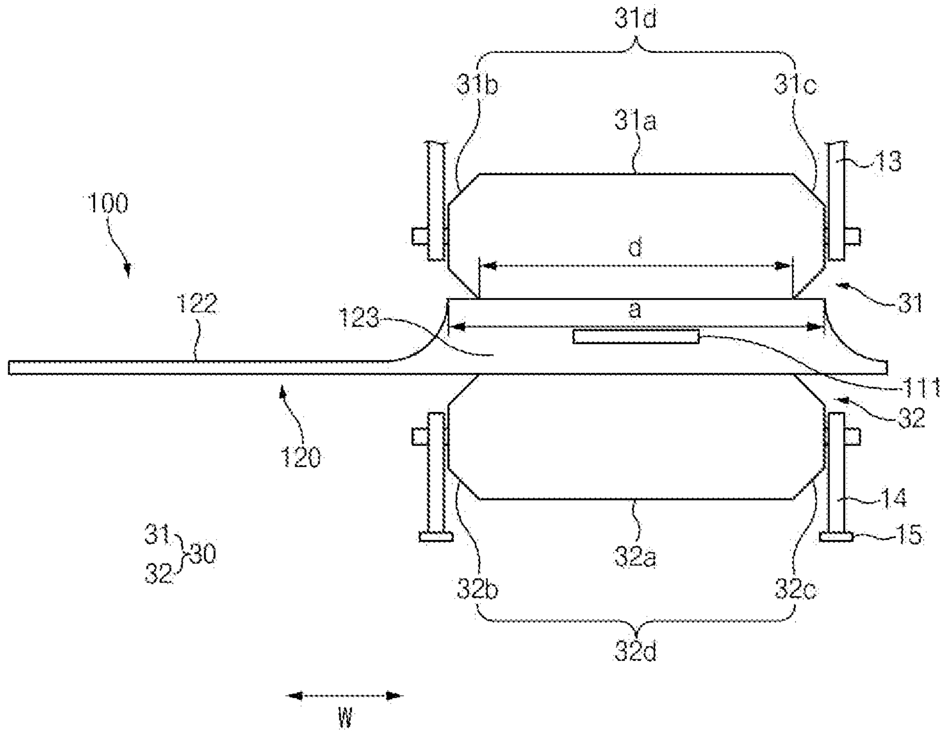
FIG. 8 is a front view illustrating a pressing process in a method for manufacturing a secondary battery according to further another embodiment of the present invention.

FIG. 8 is a front view illustrating a pressing process in a method for manufacturing a secondary battery according to further another embodiment of the present invention.

Referring to FIGS. 1 to 8, a method for manufacturing a secondary battery according to further another embodiment of the present invention comprises an accommodation process of accommodating an electrode assembly 110 in a pouch 120 to form a cell 100, an activation process of activating the cell 100, a pressing process of roll-pressing the cell 100, and a degassing process of discharging an internal gas of the cell 100.

In addition, the method for manufacturing the secondary battery according to further another embodiment of the present invention may further comprise an aging process of allowing the cell 100 to elapse for a predetermined time and a sealing process of sealing the pouch 120.

The method for manufacturing the secondary battery according to further another embodiment of the present invention is different from the method for manufacturing the secondary battery according to the foregoing embodiments of the present invention in embodiment of a pressing process. Thus, contents of this embodiment, which are duplicated with those according to the forgoing embodiment, will be omitted or briefly described, and also, differences therebetween will be mainly described.

In more detail, in the method for manufacturing the secondary battery according to further embodiment of the present invention, in the accommodation process, the electrode assembly 110, the electrolyte, and one side portion of each of electrode leads 111 and 112 connected to electrodes may be accommodated in an accommodation part 121 formed in the pouch 120 to form the cell 100.

In addition, in the accommodation process, the other side portion of each of the electrode leads 111 and 112 may be accommodated to protrude to the outside of the pouch 120.

Here, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100.

In the pressing process, after the activation process, the cell 100 is sequentially pressed through pressing rolls 30 to perform a roll press.

In addition, in the pressing process, the cell 100 may be roll-pressed in a full-length direction T of the cell 100, which is the protrusion direction of the electrode leads 111 and 112. Here, in the pressing process, the body 123 of the pouch 120 may be pressed.

Furthermore, in the pressing process, after disposing the cell 100 between the pair of pressing rolls 30, the pair of pressing rolls 30 may sequentially press both surfaces of the cell 100. Here, the pressing roll 30 may be in line contact with the cell 100. Thus, when the cell 100 is pressed through the pressing rolls 30 while being rolled, a linear pressure is sequentially applied to an outer surface of the cell 100. Thus, the gas disposed inside the electrode assembly 110 may be easily discharged to the outside of the electrode assembly 110. Here, the pair of pressing rolls 30 may comprise a first roll 31 for pressing an upper portion of the cell 100 and a second roll 32 for pressing a lower portion of the cell 100.

In addition, in the pressing process, the pair of pressing rolls 30 may be provided at a horizontal position.

Also, in the pressing process, a portion except for an edge of the body 123 in the pouch 120 may be pressed in the full-width direction W.

In addition, in the pressing process, each of both side portions 31*d* and 32*d* of the pressing roll 30 may be formed to have a diameter that is gradually smaller toward an end thereof. Here, both side portions 31*d* and 32*d* of the pressing roll 30 may comprise one side portion 31*b* disposed at one side in the full-width direction W of the cell 100 and the other side portion 31*c* disposed at the other side. In this case, in the pressing process, a length d of each of central portions 31*a* and 32*a* of the pressing roll 30 may be provided to be smaller than a width a of the body 123.

Furthermore, in the pressing process, each of both the side portions 31*d* and 32*d* of the pressing roll 30 may be chamfered. That is, in the pressing process, a corner of an outer circumferential surface of each of both the side portions 31*d* and 32*d* of the pressing roll 30 may be formed to have an inclined surface having a diameter that is gradually smaller toward an end thereof.

Thus, in the electrode assembly 110 accommodated in the body 123, a central portion except for the edge in the full-length direction T of the cell 100 may be pressed by the pressing roll 30. Thus, the gas disposed in the central portion of the electrode assembly 110 may move to the edge of the electrode assembly 110 and then be discharged to the outside of the electrode assembly 110.

Apparatus for Manufacturing Secondary Battery According to an Embodiment

Hereinafter, an apparatus for manufacturing a secondary battery according to an embodiment of the present invention will be described.

Referring to FIGS. 1 and 4, an apparatus for manufacturing a secondary battery according to an embodiment of the present invention comprises a pressing roll 10 pressing a cell 100, in which an electrode assembly 110 and an electrolyte are accommodated in a pouch 120, and a support supporting the pressing roll 10. The pressing roll 10 performs roll press on the cell 10 in a full-length direction T of the cell 100 to manufacture a secondary battery.

The apparatus for manufacturing the rechargeable battery according to an embodiment of the present invention relates to an apparatus for manufacturing a secondary battery that is applied to the method for manufacturing the secondary battery according to the foregoing embodiment. Thus, contents according to this embodiment, which are duplicated with the method for manufacturing the secondary battery according to the foregoing embodiment, will be omitted or briefly described, and also, differences therebetween will be mainly described.

In more detail, the pressing roll 10 may sequentially press the cell 100, in which the electrode assembly 110 and the electrolyte are accommodated in the pouch 120, before a degassing process after an activation process to perform roll press.

Here, in the electrode assembly 110, electrodes and separators may be alternately stacked on each other.

One side portion of each of electrode leads 111 and 112 connected to the electrodes may be accommodated in the pouch 120, and the other side may protrude to the outside of the pouch 120. At this time, the pressing roll 10 may perform the roll press in a full-length direction T of the cell 100 which is a protrusion direction of the electrode leads 111 and 112.

Also, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100. Here, the full-width direction W of the cell 100 may be perpendicular to a full-length direction T, which is a protrusion direction of the electrode leads 111 and 112 in the plan view.

Also, the pressing roll 10 may be provided in a pair. After disposing the cell 100 between the pair of pressing rolls 10, the pair of pressing rolls 10 may sequentially press both surfaces of the cell 100. Here, the pressing roll 10 may be in line contact with the cell 100. Thus, when the cell 100 is pressed through the pressing rolls 10 while being rolled, a linear pressure is sequentially applied to an outer surface of the cell 100. Thus, the gas disposed inside the electrode assembly 110 may be easily discharged to the outside of the electrode assembly 110.

Here, the pair of pressing rolls 10 may comprise a first roll 11 for pressing an upper portion of the cell 100 and a second roll 12 for pressing a lower portion of the cell 100.

The pressing roll 10 may press a portion except for an edge of the body 123 in the pouch 120 in the full-width direction W of the cell 100. For this, the pressing roll 10 may be formed to have a diameter of each of both side portions 11*d* and 12*d*, which is smaller than a diameter of each of central portions 11*a* and 12*a*.

Here, a length b of the central portion of the pressing roll 10 may be provided to be smaller than a width a of the body 123. That is, the length b of the central portion of the pressing roll 10, which is parallel to the full-length direction T of the cell 100, may be provided to be smaller than the width a of the body 123 of the pouch 120, which is parallel to the full-length direction T of the cell 100 so that the portion except for the edge of the body 123 is pressed.

Here, both side portions 11*d* and 12*d* of the pressing roll 10 may comprise one side portion lib disposed at one side in the full-width direction W of the cell 100 and the other side portion 11*c* disposed at the other side.

In addition, each of both the side portions 11*d* and 12*d* of the pressing roll 10 may be formed to have a gradually smaller diameter toward an end thereof.

Thus, in the electrode assembly 110 accommodated in the body 123, a central portion except for the edge in the full-length direction T of the cell 100 may be pressed by the central portions 11*a* and 12*a* of the pressing roll 10. Thus, the gas disposed in the central portion of the electrode assembly 110 may move to the edge of the electrode assembly 110 and then be discharged to the outside of the electrode assembly 110. Here, the gas discharged to the outside of the electrode assembly 110 may be disposed in the accommodation part 121 or the gas pocket part 122 inside the pouch 120 and then be discharged to the outside of the pouch 120 through the degassing process. Here, an outer surface of each of both the side portions 11*d* and 12*d* of the pressing roll 10 may have a curvature that is rounded from each of the central portions 11*a* and 12*a* toward each of the ends. That is, in the pressing roller 10, the curvature may be formed at a corner of each of both the side portions 11*d* and 12*d* in the full-width direction W of the cell 100.

Thus, in the electrode assembly 110 accommodated in the body 123, a central portion except for the edge in the full-length direction T of the cell 100 may be pressed by the central portions 11*a* and 12*a* of the pressing roll 10. Thus, the gas disposed in the central portion of the electrode assembly 110 may move to the edge of the electrode assembly 110 and then be discharged to the outside of the electrode assembly 110. Here, the gas discharged to the outside of the electrode assembly 110 may be disposed in the accommodation part 121 or the gas pocket part 122 inside the pouch 120 and then be discharged to the outside of the pouch 120 through the degassing process.

At this time, the rounded curvature formed on the outer surfaces of each of both the side portions 11*d* and 12*d* in the pressing roll 10 may be formed to have a curvature radius R of 5 mm to 50 mm.

Thus, the curvature radius R is formed to be 5 nm or more, which is a lower limit value to prevent press marks on the battery and also prevent the battery from being damaged by the edge of the pressing roll 10. In addition, since the curvature radius R is formed to be less than 50 mm or less, which is an upper limit value, and thus. the pressing effect for removing the gas at the outer shell of the battery may not be deteriorated.

The supports 13 and 14 may support the pressing rolls 10. In addition, the supports 13 and 14 may support a first roll 11 and a second roll 12 of the pressing roll 10, respectively. At this time, the support 13 supporting the first roll 11 may move vertically by a moving means, and thus, the upper portion of the cell 100 may be pressed through the first roll 11. Here, the moving means may be, for example, a pneumatic or hydraulic actuator.

A load cell 15 may be provided on each of the supports 13 and 14 to detect a load pressed to the cell 100. Here, for example, the load cell 15 may be provided on the support 14 supporting the second roll 12 disposed below the cell 100.

Apparatus for Manufacturing Secondary Battery According to Another Embodiment

Hereinafter, an apparatus for manufacturing a secondary battery according to another embodiment of the present invention will be described.

Referring to FIGS. 1, 2, and 7, an apparatus for manufacturing a secondary battery according to another embodiment of the present invention comprises a pressing roll 20 pressing a cell 100, in which an electrode assembly 110 and an electrolyte are accommodated in a pouch 120, and a support supporting the pressing roll 20. The pressing roll 20 performs roll press on the cell 10 in a full-length direction T of the cell 100 to manufacture a secondary battery.

The apparatus for manufacturing the electrode assembly according to another embodiment of the present invention is different from the apparatus for manufacturing the electrode assembly according to the foregoing embodiment of the present invention in configuration of the pressing roll 20. Thus, contents of this embodiment, which are duplicated with those according to the forgoing embodiment, will be omitted or briefly described, and also, differences therebetween will be mainly described.

In more detail, in the apparatus for manufacturing the secondary battery according to another embodiment of the present invention, the pressing roll 20 may sequentially press the cell 100, in which the electrode assembly 110 and the electrolyte are accommodated in the pouch 120, before a degassing process after an activation process to perform roll press.

Here, in the electrode assembly 110, electrodes and separators may be alternately stacked on each other.

One side portion of each of electrode leads 111 and 112 connected to the electrodes may be accommodated in the pouch 120, and the other side may protrude to the outside of the pouch 120. At this time, the pressing roll 20 may perform the roll press in a full-length direction T of the cell 100 which is a protrusion direction of the electrode leads 111 and 112.

Also, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100. Here, the full-width direction W of the cell 100 may be perpendicular to a full-length direction T, which is a protrusion direction of the electrode leads 111 and 112 in the plan view.

Also, the pressing roll 20 may be provided in a pair. After disposing the cell 100 between the pair of pressing rolls 20, the pair of pressing rolls 10 may sequentially press both surfaces of the cell 100. Here, the pressing roll 20 may be in line contact with the cell 100. Thus, when the cell 100 is pressed through the pressing rolls 20 while being rolled, a linear pressure is sequentially applied to an outer surface of the cell 100. Thus, the gas disposed inside the electrode assembly 110 may be easily discharged to the outside of the electrode assembly 110.

Here, the pair of pressing rolls 20 may comprise a first roll 11 for pressing an upper portion of the cell 100 and a second roll 12 for pressing a lower portion of the cell 100.

The pressing roll 20 may press a portion except for an edge of the body 123 in the pouch 120 in the full-width direction W of the cell 100.

Also, a length c of the pressing roll 20 may be provided to be smaller than a width a of the body 123.

That is, the length c of the pressing roll 20, which is parallel to the full-length direction T of the cell 100, may be provided to be smaller than the width a of the body 123 of the pouch 120, which is parallel to the full-length direction T of the cell 100 so that the portion except for the edge of the body 123 is pressed.

Thus, in the electrode assembly 110 accommodated in the body 123, a central portion except for the edge in the full-length direction T of the cell 100 may be pressed by the pressing roll 20. Thus, the gas disposed in the central portion of the electrode assembly 110 may move to the edge of the electrode assembly 110 and then be discharged to the outside of the electrode assembly 110.

The length c of the pressing roll 20 may be formed, for example, to be smaller by 2 mm to 10 mm than the width a of the body 123 in the pouch 120.

Thus, the length c of the pressing roll 20 may be formed to be smaller by 2 mm or more, which is a lower limit value, than the width a of the body 123 to prevent an outer shell of the electrode assembly 110 from being damaged. When the electrode assembly 100 in which a negative electrode is formed to be larger than a positive electrode is pressed in a stacking direction, the negative electrode may be prevented from being damaged by an edge of the positive electrode. In addition, the length c of the pressing roll 20 may be formed to be smaller by 10 mm or less, which an upper limit value, than the width a of the body 123 to prevent a gas removal effect at an outer shell-side of the battery from being deteriorated.

The supports 13 and 14 may support the pressing rolls 20. In addition, the supports 13 and 14 may support a first roll 21 and a second roll 22 of the pressing roll 20, respectively. At this time, the support 13 supporting the first roll 21 may move vertically by a moving means, and thus, the upper portion of the cell 100 may be pressed through the first roll 21.

Apparatus for Manufacturing Secondary Battery According to Further Another Embodiment Hereinafter, an apparatus for manufacturing a secondary battery according to further another embodiment of the present invention will be described.

Referring to FIGS. 1, 2, and 8, an apparatus for manufacturing a secondary battery according to further another embodiment of the present invention comprises a pressing roll 30 pressing a cell 100, in which an electrode assembly 110 and an electrolyte are accommodated in a pouch 120, and a support supporting the pressing roll 30. The pressing roll 30 performs roll press on the cell 10 in a full-length direction T of the cell 100 to manufacture a secondary battery.

The secondary battery 300 according to further another embodiment of the present invention is different from the secondary batteries according to the foregoing embodiments in configuration of the pressing roll 30. Thus, contents of this embodiment, which are duplicated with those according to the forgoing embodiment, will be omitted or briefly described, and also, differences therebetween will be mainly described.

In more detail, in the apparatus for manufacturing the secondary battery according to further another embodiment of the present invention, the pressing roll 30 may sequentially press the cell 10, in which the electrode assembly 110 and the electrolyte are accommodated in the pouch 120, before a degassing process after an activation process to perform roll press.

Here, in the electrode assembly 110, electrodes and separators may be alternately stacked on each other.

One side portion of each of electrode leads 111 and 112 connected to the electrodes may be accommodated in the pouch 120, and the other side may protrude to the outside of the pouch 120. At this time, the pressing roll 30 may perform the roll press in a full-length direction T of the cell 100 which is a protrusion direction of the electrode leads 111 and 112.

Also, the pouch 120 may comprise a body 123 in which the accommodation part 121, in which the electrode assembly 110 is accommodated, is formed, and a gas pocket part 122 extending from the accommodation part 121 to collect a gas generated in the accommodation part 121. In addition, the gas pocket part 122 may extend in a full-width direction W of the cell 100. Here, the full-width direction W of the cell 100 may be perpendicular to a full-length direction T, which is a protrusion direction of the electrode leads 111 and 112 in the plan view.

Also, the pressing roll 30 may be provided in a pair. After disposing the cell 100 between the pair of pressing rolls 30, the pair of pressing rolls 10 may sequentially press both surfaces of the cell 100. Here, the pressing roll 30 may be in line contact with the cell 100. Thus, when the cell 100 is pressed through the pressing rolls 30 while being rolled, a linear pressure is sequentially applied to an outer surface of the cell 100. Thus, the gas disposed inside the electrode assembly 110 may be easily discharged to the outside of the electrode assembly 110.

Here, the pair of pressing rolls 30 may comprise a first roll 31 for pressing an upper portion of the cell 100 and a second roll 32 for pressing a lower portion of the cell 100.

The pressing roll 30 may press a portion except for an edge of the body 123 in the pouch 120 in the full-width direction W of the cell 100.

In addition, each of both side portions 31*d* and 32*d* of the pressing roll 30 may be formed to have a diameter that is gradually smaller toward an end thereof. Here, both side portions 31*d* and 32*d* of the pressing roll 30 may comprise one side portion 31*b* disposed at one side in the full-width direction W of the cell 100 and the other side portion 31*c* disposed at the other side. At this time, a length d of each of central portions 31*a* and 32*a* of the pressing roll 30 may be provided to be smaller than a width a of the body 123. Here, the length d of each of the central portions 31*a* and 32*a* of the pressure roll 30 corresponding to a pressing length for pressing the body 123 of the pressure roll 30 may be formed, for example, to be smaller by 2 mm to 10 mm than the width a of the body 123 in the pouch 120. Furthermore, each of both the side portions 31*d* and 32*d* of the pressing roll 30 may be chamfered. That is, a corner of an outer circumferential surface of each of both the side portions 31*d* and 32*d* of the pressing roll 30 may be formed to have an inclined surface having a diameter that is gradually smaller toward an end thereof.

Thus, in the electrode assembly 110 accommodated in the body 123, a central portion except for the edge in the full-length direction T of the cell 100 may be pressed by the pressing roll 30. Thus, the gas disposed in the central portion of the electrode assembly 110 may move to the edge of the electrode assembly 110 and then be discharged to the outside of the electrode assembly 110.

The supports 13 and 14 may support the pressing rolls 30. In addition, the supports 13 and 14 may support a first roll 31 and a second roll 32 of the pressing roll 30, respectively. At this time, the support 13 supporting the first roll 31 may move vertically by a moving means, and thus, the upper portion of the cell 100 may be pressed through the first roll 31.

Manufacturing Example 1

An accommodation process of accommodating an electrode assembly, in which electrodes and separators are alternately stacked, an electrolyte, and one side portion of an electrode lead connected to the electrode, in a pouch to form a cell, an activation process of charging the cell to activate the cell, and a pressing process of sequentially pressing the cell through a pressing roll after the activation process to press the cell were performed to manufacture a secondary battery. Here, in the accommodation process, the other side portion of the electrode lead was accommodated to protrude to the outside of the pouch, and in the pressing process, roll press was performed in a full-length direction of the cell, which is a protrusion direction of the electrode lead.

Comparative Example 1

The same process as in Manufacturing Example 1 except that the roll press is performed in a full-width direction of the cell was performed in the pressing process.

Comparative Example 2

The same process as in Manufacturing Example 1 except that the pressing process is performed after a degassing process was performed.

Experimental Example 1

Figure 9:
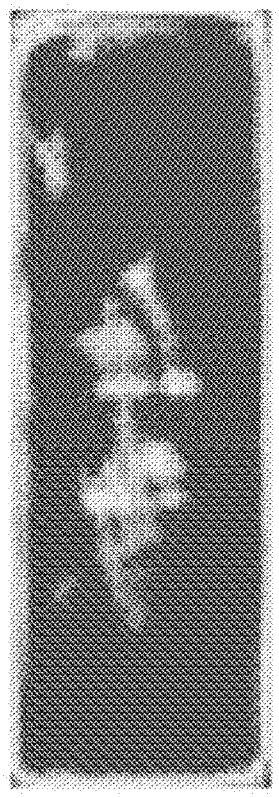
FIG. 9 is a plan view illustrating a state in which a gas within a secondary battery manufactured through a method for manufacturing a secondary battery according to Manufacturing Example 1 of the present invention is removed.
Figure 10:
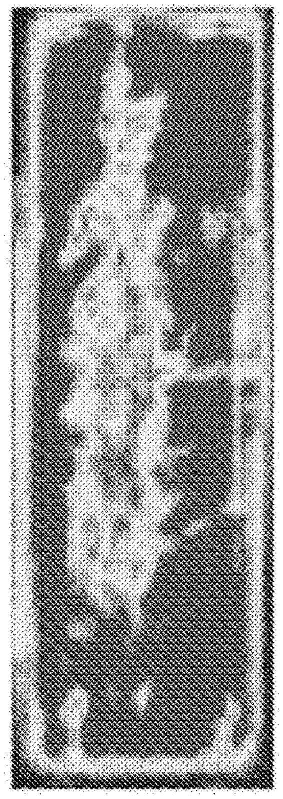
FIG. 10 is a plan view illustrating a state in which a gas within a secondary battery manufactured through a method for manufacturing a secondary battery according to Comparative Example 1 of the present invention is removed.
Figure 11:
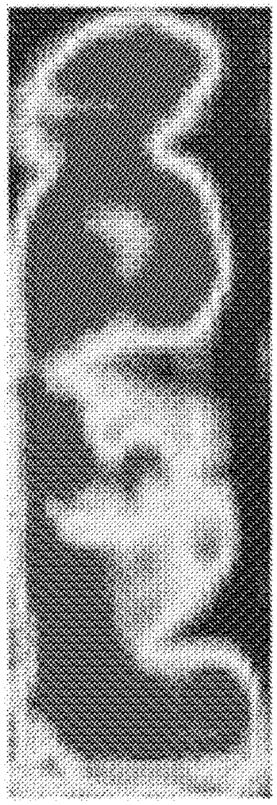
FIG. 11 is a plan view illustrating a state in which a gas within a secondary battery manufactured through a method for manufacturing a secondary battery according to Comparative Example 2 of the present invention is removed.

FIG. 9 is a plan view illustrating a state in which a gas within a secondary battery manufactured through a method for manufacturing a secondary battery according to Manufacturing Example 1 of the present invention is removed, FIG. 10 is a plan view illustrating a state in which a gas within a secondary battery manufactured through a method for manufacturing a secondary battery according to Comparative Example 1 of the present invention is removed, and FIG. 11 is a plan view illustrating a state in which a gas within a secondary battery manufactured through a method for manufacturing a secondary battery according to Comparative Example 2 of the present invention is removed.

Ultrasonic waves were applied to the secondary battery to measure a residual amount of gas inside the secondary battery through a degree of ultrasonic transmission.

In FIGS. 9 to 11, a region displayed with a red color is an ultrasonic transmission region, and a region displayed with a blue color is an ultrasonic non-transmission region. That is, the region through which the ultrasonic waves are transmittable is a region from which a gas is removed, and the region through which the ultrasonic waves are not transmittable is a region in which an internal gas is disposed.

Referring to FIG. 9, in the case of Manufacturing Example 1, a ratio of the ultrasonic non-transmission region was 2.7%, and referring to FIG. 10, a ratio of the ultrasonic non-transmission region in Comparative Example 1 was 17.2%, and referring to FIG. 11, a ratio of the ultrasonic non-transmission region in Comparative Example 2 was 44.8%.

Therefore, it is seen that, in the case of Manufacturing Example 1, a ratio of the ultrasonic non-transmission region is 2.7%, and thus, only a very small amount of internal gas is present, whereas in the case of Comparative Example 1, a ratio of the ultrasonic non-transmission region is 17.2%, and thus, a significant amount of internal gas is present, and in the case of Comparative Example 2, a ratio of the ultrasonic non-transmission region is 44.8%, and thus, a significant amount of internal gas is present.

As a result, it is seen that, in the technology of performing the rolling and pressing in the full-length direction of the cell according to Manufacturing Example 1, a residual amount of internal gas is remarkably reduced when compared to the technology of performing the rolling in the full-width direction of the cell according to Comparative Example 1.

In addition, it is seen that, in the technology of performing the rolling and pressing in the full-length direction of the cell before the degassing process according to Manufacturing Example 1, a significant residual amount of internal gas is remarkably reduced when compared to the technology of performing the rolling in the full-length direction of the cell after the degassing process according to Comparative Example 2.

While the present invention has been particularly shown and described with reference to exemplary embodiments thereof, it is to be understood that the scope of the present invention is not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10, 20, 30: Pressing roll
11, 21, 31: First roll
12, 22, 32: Second roll
11*a*, 12*a*, 31*a*, 32*a*: Central portion
11*b*, 12*b*, 31*b*, 32*b*: One side portion
11*b*, 12*b*, 31*b*, 32*b*: The other side portion
11*d*, 12*d*, 31*d*, 32*d*: Both side portion
13,14: Support
15: Load cell
100: Cell
100': Secondary battery
110: Electrode assembly
111: Positive electrode lead
112: Negative electrode lead
120: Pouch
121: Accommodation part
122: Gas pocket part
123: Body
T: Full-length direction
W: Full-width direction

The invention claimed is:

1. A method for manufacturing a secondary battery, the method comprising:

an accommodation process of accommodating an electrode assembly, in which electrodes and separators are alternately stacked, an electrolyte, and one end portion of each of a plurality of electrode leads connected to the electrodes, in a pouch to form a cell;

an activation process of charging the cell to activate the cell;

after the activation process, a pressing process of sequentially pressing the cell with a pair of pressing rolls; and after the pressing process, a degassing process of discharging an internal gas of the cell to an outside of the pouch, wherein, during the pressing process, a body of the pouch, in which the electrode assembly is accommodated, is pressed so that a portion of the electrode assembly except for an edge of the electrode assembly is pressed.

2. The method of claim 1, wherein the pouch comprises:

the body in which an accommodation part, in which the electrode assembly is accommodated, is formed; and a gas pocket part extending from the accommodation part, the gas pocket part being configured to collect the internal gas generated in the accommodation part, wherein another end portion of each of the plurality of electrode leads protrudes to the outside of the pouch, and the gas pocket part extends in a full-width direction of the cell, which is perpendicular to a protrusion direction of each of the plurality of electrode leads.

3. The method of claim 2, wherein, during the pressing process, the pair of pressing rolls sequentially press two opposite surfaces of the cell simultaneously.

4. The method of claim 2, wherein, during the pressing process, a roll press is performed in a full-length direction of the cell, which is a protrusion direction of each of the plurality of electrode leads.

5. The method of claim 4, wherein, during the pressing process, the pressing is performed on the portion of the body except for the edge of the body in the full-width direction of the cell.

6. The method of claim 5, wherein each of the pressing rolls are formed so that a diameter of each of two opposite side portions thereof is smaller than a diameter of a central portion thereof.

7. The method of claim 6, wherein each of the two opposite side portions of each of the pressing rolls have a diameter that gradually decrease from the central portion toward respective opposite ends thereof.

8. The method of claim 7, wherein an outer surface of each of the two opposite side portions of each of the pressing rolls has a curvature that is rounded from the central portion toward the respective opposite ends thereof.

9. The method of claim 5, wherein a length of each of the pressing rolls is smaller than a width of the body of the pouch.

10. The method of claim 5, wherein each of the two opposite side portions of each of the pressing rolls is chamfered.

11. The method of claim 1, further comprising an aging process of allowing the cell to age for a predetermined time, wherein the pressing process is performed during the aging process.

* * * * *